March 28, 1961 D. R. VINSON 2,977,022
AUTOMATIC FEED APPARATUS
Filed Nov. 29, 1956 2 Sheets-Sheet 1
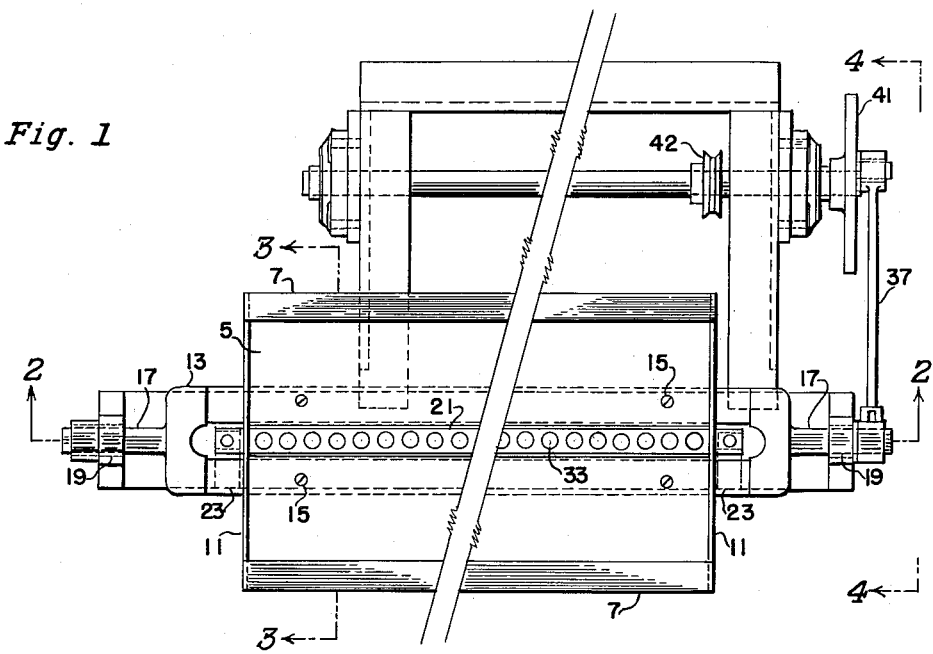
Fig. 1
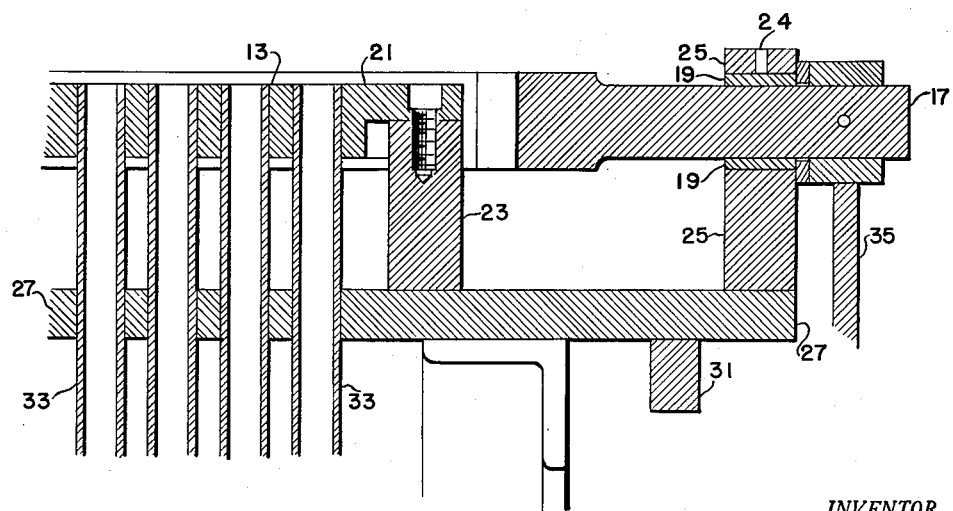
Fig. 2
INVENTOR.
DONALD R. VINSON
BY 

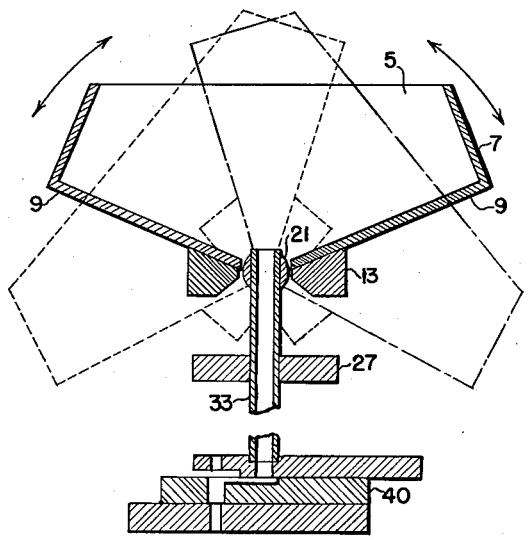
Fig. 3
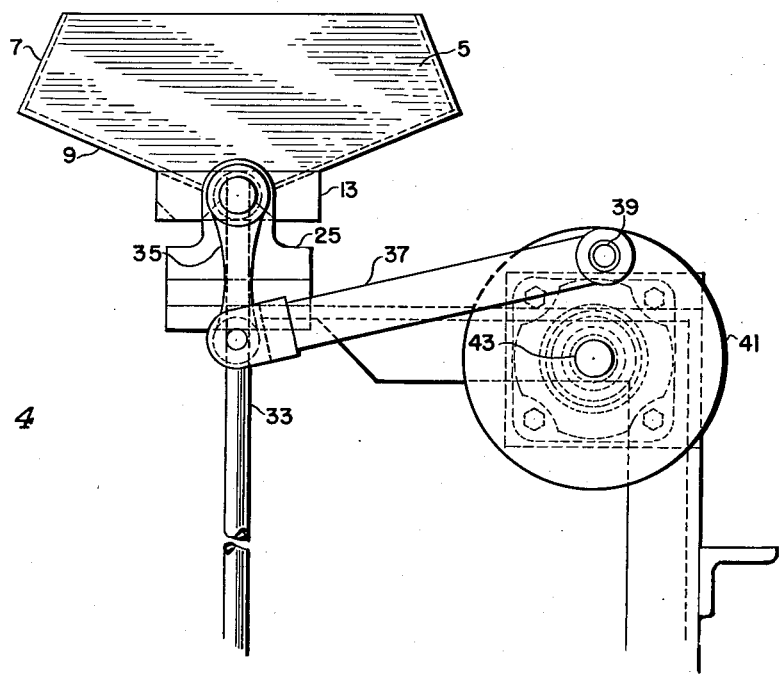
Fig. 4
INVENTOR.
DONALD R. VINSON
BY 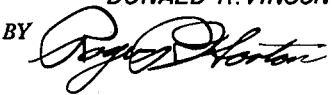

United States Patent Office 2,977,022
Patented Mar. 28, 1961

2,977,022

AUTOMATIC FEED APPARATUS

Donald R. Vinson, Tamaqua, Pa., assignor to Atlas Powder Company, Wilmington, Del., a corporation of Delaware Filed Nov. 29, 1956, Ser. No. 625,137

4 Claims. (Cl. 221—68)

The present invention relates to a device for serially discharging articles from a batch of like articles.

While it will be apparent that the invention can be applied to the discharge of a variety of articles, it will be specifically described in connection with the handling and discharging of rubber plugs adapted to the manufacture of electric blasting caps.

The rubber plugs which are serially discharged in the specific embodiment of the present invention are cylindrical plugs which provide end closures for metal shells of electric blasting caps. The aforesaid rubber plugs in a specific embodiment to which the invention has been applied are precut and measure $5/16''$ in diameter and $5/16''$ in length. In addition to providing a seal for the initiator shell the rubber plugs are adapted to retain lead wires which are attached to an electric firing device inside the blasting caps.

The development of automatic apparatus for the assembly of blasting caps makes desirable a machine for delivering the rubber plugs into a plug holder or plate for transfer to subsequent operations as for example, the slitting operation disclosed in co-pending application, Serial No. 427,064, filed May 3, 1954 by Daniel D. Huyett, now Patent No. 2,797,473, patented July 2, 1957.

Formerly the operation of placing the plugs in the plug holder was performed manually because the material from which the plugs were fabricated and the shape of the plugs prevented the application of conventional automatic feeding equipment to the operation. Because of the characteristics of the rubber plugs such as resilience and deformability, and high coefficient of friction against the hopper parts and each other, known designs of automatic feed equipment offered no solution to efficient handling of this type of material.

The principal object of the present invention is to provide an apparatus which will serially discharge articles from a batch of similar articles.

Another object of the invention is to provide an apparatus which will serially discharge rubber plugs adapted to the manufacture of electric blasting caps from a batch of like rubber plugs. Still another object of the invention is to provide a delivery apparatus in which the rubber plugs will not jam even though some of the plugs may be irregular in size and shape.

Further objects and advantages include an automatic feed device that is sturdy, yet simple, making the capital investment required nominal; a device that requires little or no maintenance and one that may be easily cleaned and requires little human supervision.

The above objects may be achieved by providing an apparatus or machine comprising an oscillating hopper constructed with a bottom having a slot extending thereacross and at least one drop tube extending downwardly from said slot. More specifically, the bottom of the hopper slopes toward the slot from both sides thereof and a convex tube plate is positioned in the slot and extends the full length of the slot between the edges thereof. A plurality of open drop tubes extend downwardly from the tube plate. The hopper oscillates about the center of curvature of said tube plate which center also coincides with the projected apex of the sloping bottom causing the rubber plugs to enter the drop tubes, which drop tubes remain well filled at all times. The plugs are readily removed from the bottom ends of the drop tubes by any convenient means for use in blasting cap assembly operations.

The invention will be particularly described in connection with the specific embodiment shown in the drawings.

Figure 1 is a part plan view of an embodiment of the invention.

Figure 2 is a partial section taken along 2—2 of Figure 1.

Figure 3 is a partial section taken at line 3—3 of Figure 1.

Figure 4 is an end view taken at line 4—4 of Figure 1.

Referring now to the drawings, the illustrated embodiment includes a hopper 5, having side walls 7, end walls 11, and sloping bottom walls 9 (see Fig. 3), for holding rubber plugs. Hopper 5 has a slot extending the entire length of the bottom of the hopper 5, and is attached to a slotted support bar 13, with screws 15, said support bar 13 being machined on both ends to form trunnions 17, which are journaled in a journal block 25 (see Fig. 2), with suitable bushings 19, said journal block and bushings being provided with oil holes 24.

A cylindrical fixed tube retaining bar 21 is mounted on rigid stands 23, so that the longitudinal centerline of said fixed tube retaining bar 21 coincides with the longitudinal centerline of the trunnions 17, of the split support bar 13, and the projected apex of the sloping bottom portions 9, of hopper 5. The fixed tube retaining bar support stands 23, and journal blocks 25 are mounted on support plate 27, which plate is attached to a plug slitting and wire insertion apparatus (not shown) and suitably spaced therefrom by spacers 31.

Drop tubes 33, extend to the top of the fixed tube retaining bar 21 and serve to convey the rubber plugs from the hopper 5, to a sliding plug holder or plate 40, as illustrated diagrammatically in Figure 3.

Oscillating motion is imparted to the trunnion 17, support bar 13, and hopper 5, by the following means:

One end of a crank arm 35 (see Figs. 2 and 4), is keyed into one trunnion 17; the other end of the crank arm 35, is pinned into the clevis of connecting rod 37; connecting rod 37 has a bearing which receives crank pin 39, mounted on crank disc 41; shaft 43 is attached at one end to crank disk 41, and receives rotary motion through a sheave 42 (see Fig. 1), and electric motor (not shown). It has been found that the degree of oscillation producing optimum results on the electric blasting cap plugs is between 80° and 100°. However, the optimum degree of oscillation as well as the frequency of oscillation will vary depending on the size and shape of the articles being conveyed from the hopper and can be readily determined by those skilled in the art.

For reasons of economy it is preferred to fabricate the hopper of light gauge material and to attach the hopper to a rigid support bar; however, the hopper and support bar can be fabricated as an integral unit such as a casting.

In the operation of the machine, hopper 5 is filled with rubber plugs and the hopper is oscillated slowly by the means previously described. As the hopper oscillates the rubber plugs fall from side to side across the tube retaining bar or tube plate 21, and the mouths of drop tubes 33. Those plugs which strike the open mouths of drop tubes 33, in a position such that they can enter the tubes fall into drop tubes 33, until these tubes become filled. After the plugs have entered drop tubes 33, they may be readily removed from the bottom ends of the tubes by any convenient means for use in a blasting cap assembly operation. A suitable means is a sliding plate such as that shown at 40 in Figure 3 as previously described.

As indicated this machine has been found particularly useful for feeding small cylindrical rubber plugs used in electric blasting caps, such plugs as commonly made with a diameter of about 5/16 of an inch and 5/16 inch length. For this use the drop tubes are made slightly over 5/16 inch in diameter so that they readily accept the plugs in the direction of their longitudinal axis but the tube diameter is not made so great that the plugs will be accepted in other than end to end fashion. Thus in the device as operated the plugs are presented in serial end to end order. When the device is made to feed rubber plugs of the type described, it has been found desirable to construct hopper 5, so that the sloping bottom portions 9, intersect at an angle of about 130° to 140° and it is found that optimum results are produced with a degree of oscillation between about 80° and 100° divided approximately evenly on each side of the vertical. An oscillation speed of up to 45 r.p.m. has also been found desirable for the purposes of discharging the rubber plugs hereinabove described.

When the machine is constructed and operated in this manner, it has been found that rubber blasting cap plugs are rapidly transferred from the hopper to the drop tubes. The drop tubes remain well filled at all times and the plugs are stacked in the tubes in end to end fashion where they may be readily removed serially.

The construction and operation of the apparatus have been described in connection with the feeding of rubber electric blasting cap plugs. It will be obvious that the device can be used equally advantageously in the feeding of other articles which it is desired to arrange in position for serial use at a later time, i.e., the device can be used for feeding articles made of plastic, cardboard, vulcanized fiber, glass and many other materials and may also be used for handling articles of various structural configurations.

While a particular embodiment of the present invention has been illustrated and described herein, it is not intended to limit the invention to such a disclosure and changes and modifications may be incorporated and embodied therein within the scope of the following claims.

I claim:
1. An automatic feed apparatus comprising an elongated hopper including a lower portion of generally V-shaped transverse cross section, said lower portion having an elongated, longitudinally-extending slot defined by transversely-spaced, substantially parallel edges extending longitudinally along said lower portion at opposite sides of the projected apex of said V-shaped lower portion; an elongated tube support member positioned longitudinally in said slot and having a convex upper surface with its axis of curvature parallel to the axis of said tube support member and below said slot, the radius of curvature of said surface being slightly less than the distance from said axis of curvature to the longitudinal edges which define said slot, said tube support member and said convex upper surface having at least one aperture passing therethrough; a downwardly directed drop tube operatively attached to said tube support member with its upper end communicating with said aperture; means mounting said hopper for oscillation with respect to said tube support member and aperture about said axis of curvature of said convex upper surface; and means for oscillating said hopper about said axis.

2. An automatic feed apparatus as defined in claim 1 wherein the axis of curvature of said convex upper surface of said tube support member is positioned at the projected apex of said generally V-shaped lower portion.

3. An automatic feed apparatus as defined in claim 1 wherein the amplitude of oscillation of said hopper with respect to said tube support member and aperture is such that in one extreme position of the hopper, one of the edges which define one side of the longitudinally-extending slot is juxtaposed with one extremity of said aperture and said drop tube, and in the other extreme position of said hopper the other edge which defines the other side of the longitudinally-extending slot is juxtaposed with the other extremity of said aperture and said drop tube.

4. An automatic feed apparatus as defined in claim 1 wherein said tube support member contains a plurality of apertures disposed in spaced relation along the length thereof, and wherein a plurality of downwardly-directed drop tubes are provided and are operatively attached to said tube support member with the upper ends of said drop tubes communicating with said apertures.

References Cited in the file of this patent

UNITED STATES PATENTS

| | | |
|---|---|---|
| 756,947 | Eggleston et al. | Apr. 12, 1904 |
| 801,627 | Wünsch | Oct. 10, 1905 |
| 817,852 | Haseltine | Apr. 17, 1906 |
| 1,321,726 | Ellis | Nov. 11, 1919 |
| 1,961,191 | Bliss | June 5, 1934 |
| 2,540,934 | Cook et al. | Feb. 6, 1951 |